No. 793,380. PATENTED JUNE 27, 1905.
A. T. KELLER.
BLOWING ENGINE.
APPLICATION FILED DEC. 22, 1903.
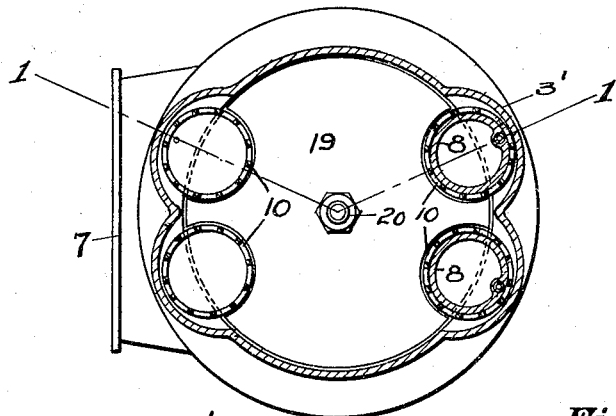
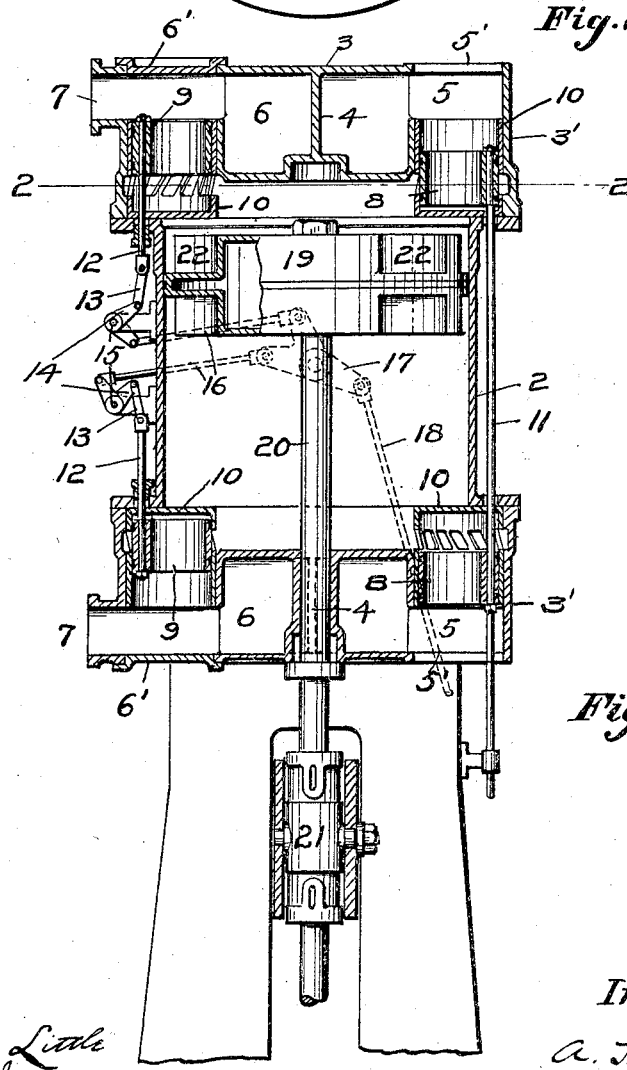
Witnesses
Inventor No. 793,380.

Patented June 27, 1905.

UNITED STATES PATENT OFFICE.

ALBERT T. KELLER, OF WILKINSBURG, PENNSYLVANIA.

BLOWING-ENGINE.

SPECIFICATION forming part of Letters Patent No. 793,380, dated June 27, 1905.

Application filed December 22, 1903. Serial No. 186,199.

*To all whom it may concern:*

Be it known that I, ALBERT T. KELLER, a citizen of the United States, residing at Wilkinsburg, in the county of Allegheny and State of Pennsylvania, have invented certain new and useful Improvements in Blowing-Engines, of which the following is a specification, reference being had therein to the accompanying drawings.

One object of this invention is to so construct and arrange the piston and the valves of a blowing-engine as to avoid the formation of dead spaces from which it is impossible to expel the air, the clearance being only such as is absolutely necessary. In the preferred arrangement the valve-casings extend longitudinally of the cylinder and the valves move in like direction.

A further object is to provide the piston with valve-embracing recesses of such form as not to materially weaken the same.

Still another object is to arrange the valves that the stems thereof are conveniently accessible to the actuating means located at the outer periphery of the cylinder, and, furthermore, to provide for operating inlet-valves at opposite ends of the cylinder on a single stem.

In the accompanying drawings, Figure 1 is a vertical longitudinal section of the improved blowing-engine, taken on line 1 1 of Fig. 2; and Fig. 2 is a sectional plan view of the cylinder and valves, taken on line 2 2 of Fig. 1.

Referring to the drawings, 2 designates the cylinder, and 3 represents the cylinder-heads, each of which is partitioned at 4 to form the air-inlet chamber 5 and outlet-chamber 6, the compressed air being forced into the latter and passing therefrom at 7 to the blast-furnace, converter, or wherever required.

While the number of valves may vary, I here show two inlet-valves 8 and two outlet-valves 9 at each end of the cylinder, the valves being of ring form and interchangeable, as shown. The valves reciprocate in cylindrical grated valve casings or cages 10, which are preferably in the form of bushings removably fixed in the cylinder-heads and closed at their inner ends, which extend into the cylinder, so that communication with the cylinder is confined to the grated openings. The construction is such that all the grated openings of each valve-cage communicate with the cylinder, or, in other words, the air from the cylinder surrounds each cage in the plane of said openings, so that when the openings are covered by the valve all sides of the latter are subjected to equal pressure, and consequently the valve does not bind and unduly wear the cage or bushing. The inlet and outlet cages and valves are respectively inserted through cylinder-head openings 5' and capped openings 6'.

The cylinder-heads are bulged at 3', and the several valve-cages 10 are so positioned therein as to extend partially within the path of the piston and partially beyond the outer periphery of the cylinder. This construction enables me to directly and rigidly connect the opposite inlet-valves 8 by the straight stem or rod 11, paralleling the cylinder exterior, the stem uniting with the valves at one side of their centers and operating through the closed inner ends of valve-cages, as shown. Stems 12 of outlet-valves 9 are projected from the valves in like manner and connected by links 13 with arms 14 of rock-shafts 15, the latter being actuated at proper intervals through the medium of connecting-rods 16, wrist-plate 17, and rod 18, power being applied to the latter and to stem 11 by any of the well-known mechanisms for this purpose. As the valve-gear forms no part of this invention and as the movements of the valves are well understood by those skilled in the art, further description of the operation is deemed unnecessary.

19 is the piston, carried by rod 20, which has the usual cross-head connection 21 with the driving-engine. (Not shown.) The piston is formed with the rounded peripheral recesses 22, complementary with the inwardly-projecting portions of valve-casings 10, so that at the end of the stroke the piston fits closely around the latter, thus minimizing the clearance and forcing substantially all air in front of the piston through outlet-valves 9.

The curvature of each piston-recess 22 is in lines parallel with the axial center of the piston, so that said recesses are of such form as not to materially weaken the piston, and hence the latter need not be made thicker or heavier on account thereof.

As opposite outlet-valves 8 move in unison, one to open and the other to closed position, and vice versa, the means here shown for connecting them is simple, direct, and efficient and in no way interferes with the operation of the piston.

Various changes and modifications may be resorted to without departing from the invention as defined by the appended claims.

I claim—

1. The combination with a cylinder and a recessed piston, of valve-cages projecting endwise into the cylinder and open at their sides only to the latter, and balanced valves operative within the cages.

2. The combination with a cylinder and a recessed piston, of valve-cages projecting endwise into the cylinder through the heads thereof, the cages being disposed longitudinally of the cylinder and closed at their inner ends and open to the cylinder at their sides only, and balanced valves operative within the cages.

3. In a blowing-engine, the combination with a cylinder, and a recessed piston, of valve-cages closed at their inner ends and open at their sides, the valve-cages extending endwise into the cylinder adjacent the periphery of the latter, the cages being constructed and arranged to communicate with the cylinder through all of their side openings, and balanced valves operative within the cages.

4. The combination with a cylinder and a recessed piston, of inlet and outlet valve cages disposed longitudinally of the cylinder and projecting endwise thereinto and intersecting the plane of the longitudinal wall of the cylinder, inlet and outlet valves operative in the cages, a stem at the exterior of the cylinder and projecting through the closed inner ends of the opposite inlet-cages and directly secured to the opposite inlet-valves, and valve-stems secured to and extending from the outlet-valves through the closed inner ends of the outlet-valve cages to the exterior of the cylinder.

5. The combination of a cylinder, valve-casings closed at their inner ends and extending longitudinally of the cylinder, the valve-casings extending laterally beyond the outer longitudinal wall of the cylinder and open at their sides to communicate with the latter, and valves operative within the casings.

6. The combination of a cylinder, valve-casings closed at their inner ends and extending longitudinally of the cylinder and projecting beyond the outer longitudinal cylinder-wall, each of the valve-casings being open on all sides and formed with a surrounding passage which communicates with the cylinder and valves, operative within the casings.

7. The combination of a cylinder, cylindrical valve-casings closed at their inner ends and extending longitudinally of the cylinder and projecting laterally beyond the outer longitudinal cylinder-wall, each of the valve-casings being formed with a series of side openings which extends entirely around the same, means whereby each of said openings is in constant communication with the cylinder, and cylindrical valves operative within the casings.

8. The combination of a cylinder, valve-casings closed at their inner ends and extending longitudinally of the cylinder and projecting laterally beyond the outer cylinder-wall, the valve-casings being open at their sides to the cylinder, valves operative within the casings, and stems secured to the valves and projecting through the closed inner ends of the casings and along the outer longitudinal wall of the cylinder.

In testimony whereof I affix my signature in presence of two witnesses.

ALBERT T. KELLER.

Witnesses:
J. M. NESBIT,
ALEX. S. MAHON.